United States Patent [19]
Hodge

[11] Patent Number: 5,525,145
[45] Date of Patent: Jun. 11, 1996

[54] FILTERING APPARATUS FOR A FORCED AIR DUCT GRILL

[76] Inventor: Joseph Hodge, P.O. Box 652, Owensville, Ohio 45160

[21] Appl. No.: 170,091

[22] Filed: Dec. 17, 1993

[51] Int. Cl.⁶ .................................................. B03C 3/30
[52] U.S. Cl. ................. 96/17; D23/365; D23/393; 55/495; 55/516; 55/DIG. 31; 454/309
[58] Field of Search ................ 55/279, 495, 508, 55/511, 516, 518, DIG. 39, DIG. 31; 96/17; D23/355, 357, 361, 364–368, 393; 454/309, 328, 337

[56] References Cited

U.S. PATENT DOCUMENTS

| | | | |
|---|---|---|---|
| 1,429,811 | 9/1922 | Tynan | 55/481 |
| 1,694,089 | 12/1928 | Wright | 261/104 |
| 1,726,792 | 9/1929 | Altman et al. | 55/481 |
| 1,737,532 | 11/1929 | Allen | 96/152 |
| 1,854,569 | 4/1932 | Welch | 55/227 |
| 1,886,460 | 11/1932 | Anderson | 55/496 |
| 2,493,257 | 1/1950 | Malme | 55/267 |
| 2,557,279 | 6/1951 | Greenberg | 55/515 |
| 2,575,499 | 11/1951 | Manow | 55/422 |
| 2,595,833 | 5/1952 | Flaherty | 160/369 |
| 2,754,747 | 7/1956 | Bertling | 454/309 |
| 2,825,500 | 3/1958 | McLean | 55/470 |
| 2,959,832 | 11/1960 | Baermann | 24/303 |
| 2,999,275 | 9/1961 | Blume, Jr. | 156/243 |
| 3,003,581 | 10/1961 | Greason | 55/514 |
| 3,019,127 | 1/1962 | Czerwonka et al. | 428/338 |
| 3,040,501 | 6/1962 | Pietsch | 55/500 |
| 3,046,719 | 7/1962 | Tropiano | 55/417 |
| 3,124,725 | 3/1964 | Leguillon | 335/303 |
| 3,136,720 | 6/1964 | Baermann | 210/222 |
| 3,159,983 | 12/1964 | Metcalfe | 62/262 |
| 3,187,662 | 6/1965 | Kreuttner | 454/265 |
| 3,203,338 | 8/1965 | Dry | 454/318 |
| 3,225,679 | 12/1965 | Meyer | 454/289 |
| 3,358,578 | 12/1967 | Meyer | 454/307 |
| 3,382,985 | 5/1968 | Muehl | 210/495 |
| 3,458,130 | 7/1969 | Juhlin | 55/511 X |
| 3,494,113 | 2/1970 | Kinney | 55/481 |
| 3,679,505 | 7/1972 | Hinderaker et al. | 156/71 |
| 3,768,235 | 10/1973 | Meyer et al. | 55/496 X |
| 3,823,926 | 7/1974 | Bracich | 55/504 X |
| 3,831,765 | 8/1974 | Flynn et al. | 55/519 X |
| 3,905,787 | 9/1975 | Roth | 55/488 |
| 3,912,473 | 10/1975 | Wilkins | 55/501 |
| 3,941,034 | 3/1976 | Helwig et al. | 55/484 X |
| 3,999,969 | 12/1976 | Shuler | 55/418 |
| 4,047,914 | 9/1977 | Hansen et al. | 55/488 |
| 4,065,262 | 12/1977 | Petroff | 55/279 X |
| 4,175,936 | 11/1979 | Lough et al. | 55/413 X |
| 4,334,899 | 6/1982 | McConnell | 55/501 X |
| 4,470,834 | 9/1984 | Fasanaro et al. | 55/501 |
| 4,724,749 | 2/1988 | Hedrick | 55/355 X |
| 4,961,849 | 10/1990 | Hull et al. | 55/495 X |
| 5,100,445 | 3/1992 | Johnson et al. | 55/413 |
| 5,107,580 | 4/1992 | Watanabe | 55/467 X |
| 5,176,570 | 1/1993 | Liedl | 55/481 X |
| 5,240,487 | 8/1993 | Kung | 55/486 |
| 5,240,653 | 8/1993 | Ramkissoon | 55/279 X |

*Primary Examiner*—Richard L. Chiesa
*Attorney, Agent, or Firm*—Steven J. Rosen

[57] ABSTRACT

A filter apparatus has a rigid housing surrounding a piece of preferably self charging electrostatic filter material and having a preferably magnetic attachment device for mounting the filter apparatus directly in front of a grill at an end of a cold air return or supply of a forced air system, for a heating and/or air conditioning system. The filter and housing are generally sized so that the frame does not cover any of the openings on the grill over which it is designed to be placed. Decorative openwork is positioned in the front of the filter material to provide an aesthetically pleasing covering of what is considered less than attractive filter material.

16 Claims, 2 Drawing Sheets

FILTERING APPARATUS FOR A FORCED AIR DUCT GRILL

BACKGROUND OF THE INVENTION

1. Field of the Invention

This invention relates generally to forced air heating and air conditioning systems and more particularly to a filter unit which fits over and is easily mounted over and attached to the outside of a grill of an air return or an outlet of such a system.

2. Description of Related Art

The applicant has searched the commercial availability of filter units that can be easily placed over and removably secured to grills of air returns and outlets for forced air heating and air conditioning systems and has found no such devices. A need exists for such a filter device that is easily mounted over and attached to an existing duct grill so as to provide ease of washing of a filter element constructed with a self charging electrostatic filter material or for easy replacement of a replaceable filter element. The filter device must allow for maximum airflow through the filtering element particularly for electrostatic self charging filter materials to permit proper operation and maximum filtering efficiency. The filter device should be easily mounted and dismounted, not unattractive to look at, and unobtrusive. The filter device should be easily used with existing grills presently found in the construction industry so as to avoid costly manufacturing and start-up costs.

The prior art clearly makes obvious a need for a filtering device to increase filtering effects of the heating and air conditioning system by adding to the normal single furnace or air conditioning filter which only filters upon introduction of air to the used area. By filtering return air, the unit accommodating the air movement receives the air in a cleaner condition, which is beneficial to the operating unit and probably, most commonly, is the ease of filter change. Additional filtering of the supply duct air through registers is also beneficial for further filtering air being supplied to living space in a building such as the room of a house.

Prior patented art found by the applicant includes the following listed U.S. Pat. Nos.: Tynan, 1,429,811, Sep. 19, 1922; Tropiano, 3,046,719, Jul. 31, 1962; Wright, 1,694,089, Dec. 4, 1928; Anderson, 1,886,460, Nov. 8, 1932; Kung, 5,240,487, Aug. 31, 1993; Liedl, 5,176,570, Jan. 5, 1993; and Hull, 4,961,849, Oct. 9, 1990.

The Anderson and Wright patents are directed to registers which require total removal of the register for filter access and thus do not provide easy removal and replacement or washing of the filter element. The Tynan and Liedl references disclose register attachments that integral with the register and may not easily be attached without modifying the register and or the duct system. The Schroeder and Kung patents provide filters that are inserted into and disposed transversely of the duct outlet behind the grill and thus also do not provide easy removal, replacement or washing of the filter element. The Hull patent is directed to filter material framed by a magnetically impregnated material and designed to be placed over metallic vents. However such a design has several drawbacks such as not providing a rigid support to hold the filter material flat, particularly after being washed. This problem is exasperated for wall mounted return duct grills which are large and for which the filter elements that are required are correspondingly large. Many grills do not provide sufficient metallic surface around their openwork for the frame of Hull to attach to and therefore the frame would have to be made wider thereby covering some of the openwork and cutting down on the airflow through the filter. The Hull design is also not particularly suitable for use in a room because the uncovered filter material is not aesthetical pleasing.

OBJECTS OF THE INVENTION

It is accordingly an object of the present invention to provide a filter device that can be easily placed over and removably secured to grills of air returns and outlets for forced air heating and air conditioning systems particularly so that the device's filtering element may be easily washed or replaced.

It is another object to provide a filter device that permits the maximum airflow through the filtering element as allowed by the grill and minimizes airflow losses through the filter device and grill. This is particularly important as it applies to the use of self charging electrostatic filter material that relies on moving air in the system to charge the filter material.

It is a further object of the invention to provide a filter device that besides being easily mounted and dismounted is not unattractive to look at and is unobtrusive.

A further object of the invention to provide a filter device that can be easily used with existing grills presently found in the construction industry so as to avoid costly manufacturing and start-up costs.

Additional objects and advantages will be apparent to one skilled in the art and still other advantages and objects will become apparent hereinafter.

SUMMARY OF THE INVENTION

The present invention provides a filter apparatus that includes a rigid housing surrounding a piece of preferably self charging electrostatic filter material for providing a filter means directly in front of a grill at the end of a cold air return or supply duct of a forced air system for a heating and/or air conditioning system. One embodiment provides a piece of filter material, preferably cleanable and of the self charging electrostatic type, mounted within and supported by a peripherally disposed rigid plastic frame which forms the housing. An attachment means for mounting the filter apparatus in over the front of the grill is mounted on the frame. Among the preferred attachment means are corner and back face mounted magnets along or in the frame which easily attach to conventional metallic grills. The filter and frame are constructed so that flow through planes of the filter are generally parallel to the front face of the grill. The filter and frame are generally sized so that the frame does not cover any of the openings on the grill over which it is designed to be placed.

In one embodiment, the filter material is held slightly apart from but almost flush against the grill, while in another embodiment, the frame has a more substantial depth to space the filter a distance off the grill. The latter embodiment, being particularly useful for baseboard and other type of vent grills, having adjustable louvers and/or an uneven grill face.

More specific embodiments provide a decorative openwork in the front of the apparatus to provide an aesthetically pleasing covering of what is considered the less than attractive filter material.

The foregoing, and other features and advantages of the present invention, will become more apparent in the light of the following description and accompanying drawings.

BRIEF DESCRIPTION OF THE DRAWINGS

The foregoing aspects and other features of the invention are explained in the following description, taken in connection with the accompanying drawings where.

DETAILED DESCRIPTION OF THE PREFERRED EMBODIMENTS

Figure 1:
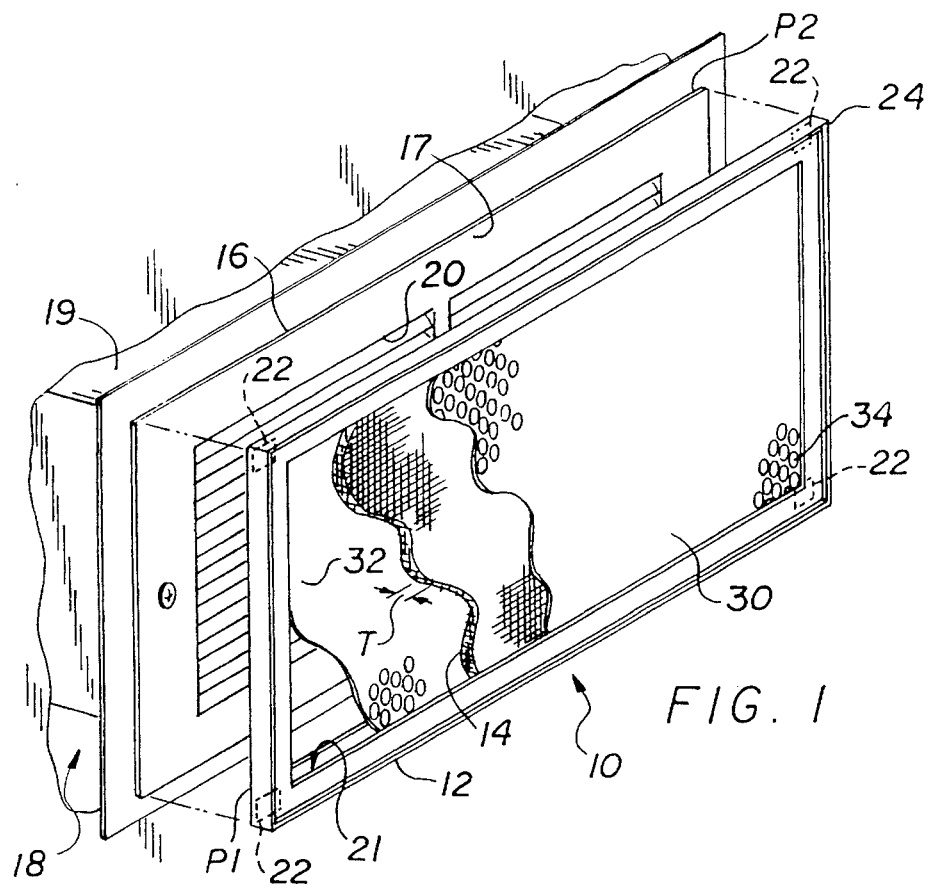
FIG. 1 is a partial cut-away perspective view of a filter apparatus in accordance with a first exemplary embodiment of the present invention.
Figure 2:
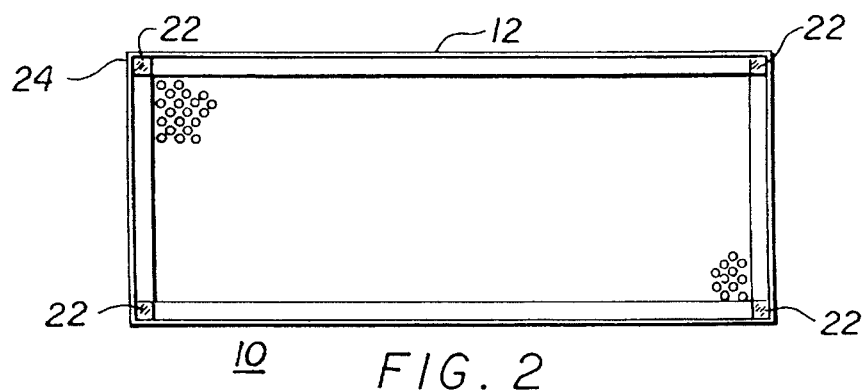
FIG. 2 is an elevated view of the rear of the filter apparatus in FIG. 1.
Figure 3:
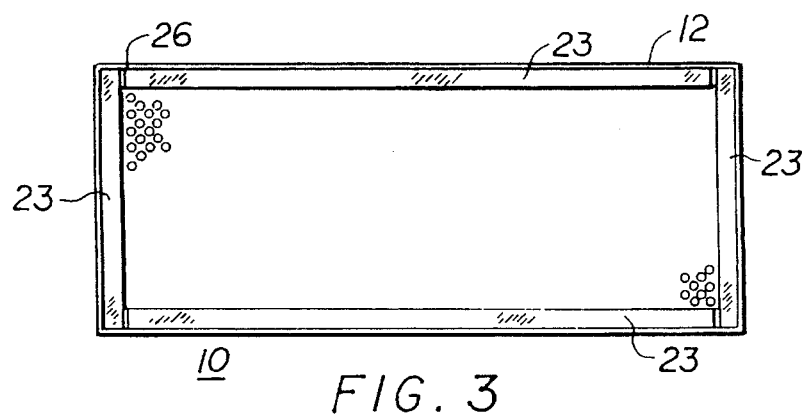
FIG. 3 is an elevated view of the rear of a filter apparatus as in FIG. 1 but with an alternate magnetic attachment means.

Illustrated schematically in FIG. 1 is a filter apparatus 10 including a rigid housing 12 which contains and supports a preferably self charging electrostatic filter material 14 for providing a filter means directly in front of a grill 16 at a room end 18 of a cold air return or supply duct 19 of a forced air system for a heating and/or air conditioning system. The grill 16 includes a front face 17 having airflow apertures 20 disposed therethrough which may be louvered or otherwise. The housing 12 and the sheet of filter material 14 which it supports is commercially available as an integral unit with self charging electrostatic filter material that is cleanable by a simple washing and may be ordered in a specified size. Such an integral unit typically includes a sheet of filter material 14 mounted within and vertically supported by a peripherally disposed rigid plastic frame having a C or U channel 21 wherein the plastic frame serves as the housing 12 and has a width W that is only slightly wider than a thickness T of the filter material. An easily removable attachment means, in the form of magnets 22, are disposed in the corners 24 of the housing 12 for mounting the filter apparatus 10 in front of and over the metallic grill 16 as is shown in FIG. 2. An alternative magnetic attachment means is shown in FIG. 3 as having strips 23 of magnetic material disposed along the inside edges 26 of the plastic frame which serves as housing 12. Thus the housing's perimeter P1 can be made to correspond to the grill's perimeter P2 so that the protrusion of the housing is minimized while obstruction of airflow through the filter apparatus 10 is minimized.

Referring back to FIG. 1, the filter material 14 is mounted within the housing 12 so as to allow air to flow through planes of the filter material that are generally parallel to the front face 17 of the grill 16. The filter 14, frame, and/or housing 12 are generally sized so as not to cover any of the airflow apertures 20 of the grill 16 over which the housing 12 is designed to be placed to allow undisturbed and unobstructed maximum airflow through the filter material. This is particularly important to insure proper operation and sufficient airflow velocity through the electrostatically chargeable filter material 14. The housing 12 is preferably made of a material that may be may be commercially made available in aesthetical pleasing colors or easily painted such as plastic or coated or painted metal and which can then also be easily washed.

The exemplary embodiment of the invention illustrated in FIG. 1 also provides a front mounted front plate 30 and an optional back mounted back plate 32. The plates 30 and 32 have decorative openwork 34 and are mounted on corresponding sides of the filter material 14 and also have their edges disposed within the channel 21. The plates 30 and 32 are preferably made of a material suitable for painting and washing such as plastic, coated or painted metal and are preferably designed to be washed together and with the housing 12 as an integral unit. The materials may also be suitable for washing the filter apparatus 10 in a dishwasher. The openwork may include holes or be a lattice work and is commercially available. The openwork 34 should be suitably designed so as not to substantially interfere with the operation of and airflow through the filter apparatus 10 of the present invention. The decorative openwork 34 in the front of the apparatus 10 provides an attractive covering of what is considered less than attractive filter material 14. Supplying two plates, 30 and 32, allows for the construction of a filtering apparatus 10 that is reversible.

Figure 4:
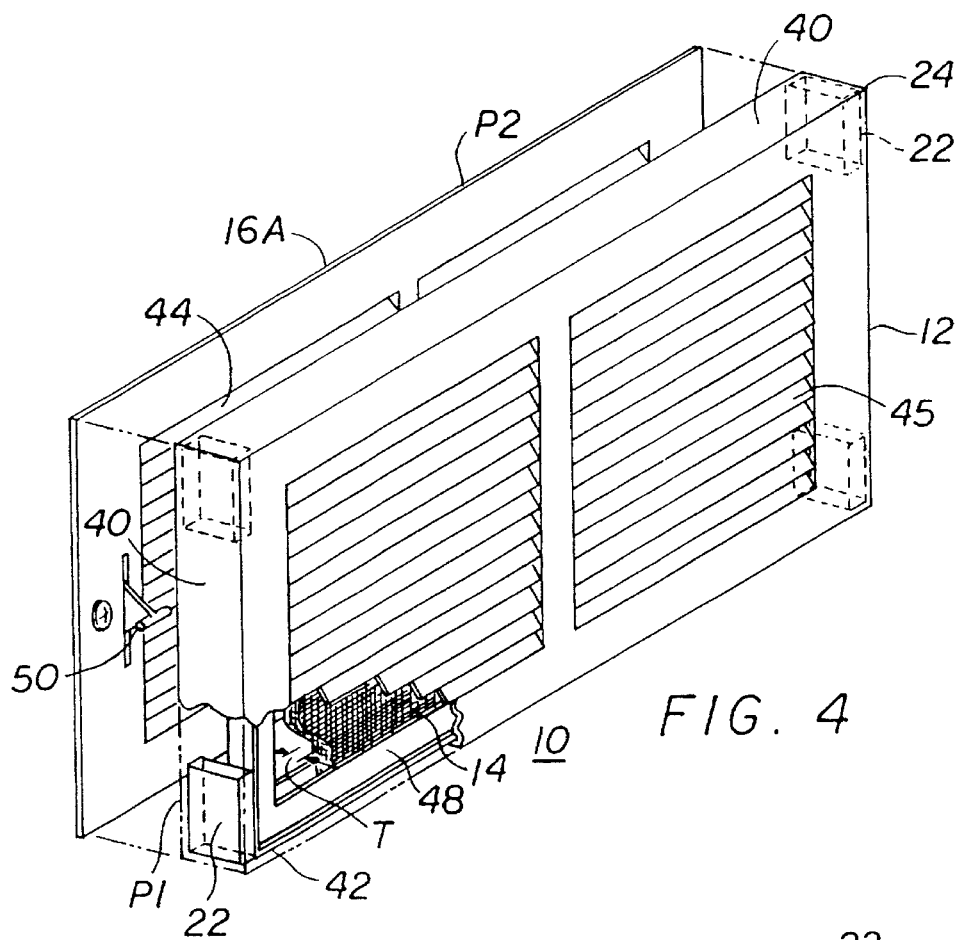
FIG. 4 is a partial cut-away perspective view of a filter apparatus in accordance with a second exemplary embodiment of the present invention.

Illustrated in FIG. 4 is another embodiment of the present invention, having a housing 12 which has sidewalls 40 that are several times wider than the thickness T of the filter material 14, which is disposed at the front end 42 of the housing 12, in order to space the filter a sufficient distance away from a grill 16A, that has protruding up from its face louvers 44, that may be adjustable, and/or a handle 50 that is used to control a variable louvers or a damper (not shown) behind the louvers. This embodiment is particularly useful over grills often found in baseboard vents having adjustable louvers and/or an uneven grill face. The sheet of filter material 14 is disposed in a plastic frame 48 similar to that which serves as the housing 12 in the embodiment illustrated in FIG. 1. The frame 48 and filter material 14 which it supports and which is commercially available as an integral unit as explained above is preferably, but not necessarily, removable from the housing 12 for cleaning by a simple washing. Four magnets 22 are disposed in the corners 24 of the housing 12 for mounting the filter apparatus 10 in front of and over the grill 16A. The magnets may be sized sufficiently long to both hold the frame 48 and filter material 14 against the front end 42 of the housing 12 and releasably attach the housing to the grill 16A. Note that the housing 12 should be made of a metal that can be strongly held by magnets to insure a good mounting over the grill. The front end 42 is shown having front louvers 45 as decorative openwork but other types may be used.

Such a filter apparatus hides or places the magnetic attachment means out of sight so that it is aesthetical pleasing and does not protrude from the apparatus. Furthermore, the housing's perimeter P1 can be made to correspond to the grill's perimeter P2 so that the protrusion of the housing is minimized while obstruction of airflow through the filter apparatus 10 is minimized.

Figure 5:
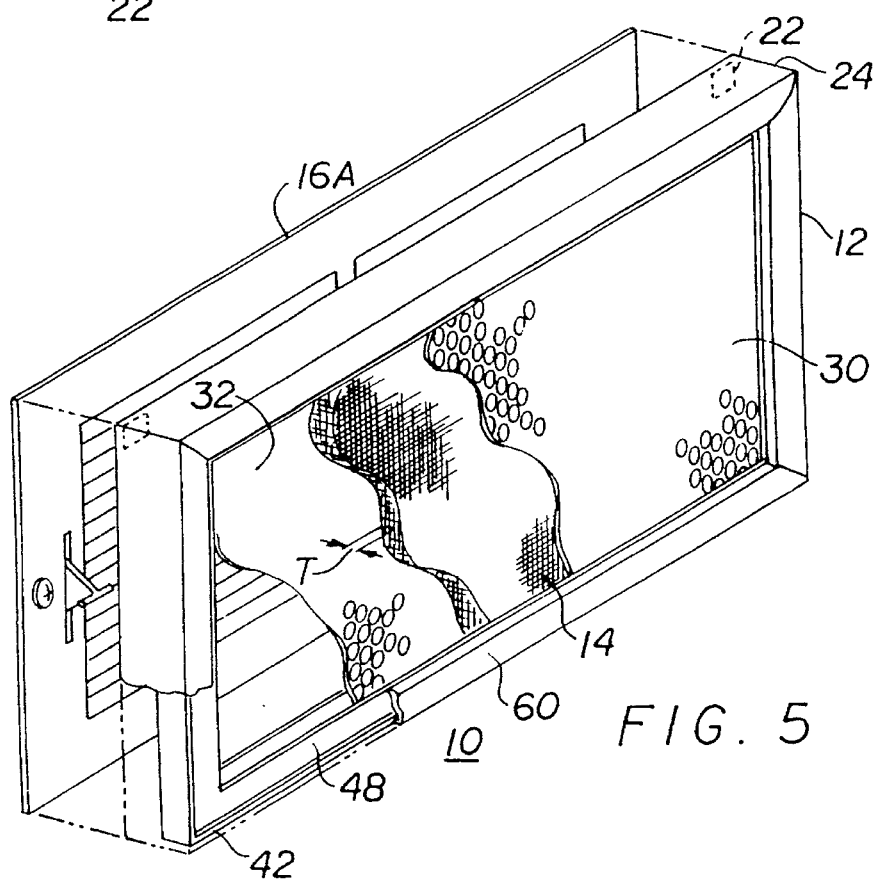
FIG. 5 is a partial cut-away perspective view of a filter apparatus in accordance with a third exemplary embodiment of the present invention.

An alternative construction of the housing 12 for the filter apparatus 10 is illustrated in FIG. 5, wherein the housing is constructed of commercially available frame channel elements 60, such as the type used for framing. As such, the channel elements are easily sized, cut and assembled (as is well known in the frame business) to form the housing 12. The frame 48, and filter material 14 which it supports, is disposed within the channel of the frame channel elements 60, and because the frame is made of plastic, it is sufficiently flexible to be removed without disassembling the housing 12, which however is still an option. Four magnets 22 are disposed in the corners 24 of the housing 12 for mounting the filter apparatus 10 in front of and over the grill 16A. The housing 12 has an open front end such that the front plate 30 with its decorative openwork 34 form a decorative front to the filter apparatus 10 as in the embodiment of FIG. 1. Back plate 32 is an optional element again providing for the ability to reverse the position of the filter frame 48 front to back.

While the preferred embodiment of the invention has been described fully in order to explain its principles, it is understood that various modifications or alterations may be made to the preferred embodiment without departing from the scope of the invention as set forth in the appended claims.

I claim:

1. A filter apparatus for filtering airflow directly in front of a grill at a room duct end of a forced air system, said filter apparatus comprising:

a grill at a room duct end of a forced air system having supply and return ducts, a filter material large enough to entirely cover all openings in said grill and positioned within and supported by a rigid housing frame, a removable flexible support means to support said filter material parallel to said grill, said housing frame having sidewalls with channels completely extending around a periphery of said filter material and said removable flexible support means such that essentially all of the airflow through said duct end is directed through said filter material, a plate having decorative openwork positioned within said channels and in front of said filter material, and a removable attachment means operably positioned within said housing frame for mounting the filter apparatus in front of and over said grill.

2. The filter apparatus of claim 1, wherein said filter material is a self charging electrostatic washable material.

3. The filter apparatus of claim 2, wherein said removable attachment means is a magnetic attachment means.

4. The filter apparatus of claim 3, wherein said frame comprises a rigid plastic frame and said support means is a channel in said frame and a sheet of said filter material is positioned within said channel and frame.

5. The filter apparatus of claim 4 wherein said magnetic attachment means comprises magnets positioned in corners on back of said frame.

6. The filter apparatus of claim 5 wherein said magnetic attachment means comprises magnetic material positioned on edges on back of said frame.

7. The filter apparatus of claim 4 further comprising a front plate having said decorative openwork positioned in a front end of said frame in front of said filter material.

8. The filter apparatus of claim 7 further comprising a decorative coating on said frame and said plate.

9. The filter apparatus of claim 3 wherein said filter material is positioned substantially at a front end of said housing frame and said housing frame is operable to contact said grill at a back end of said housing frame wherein said front and back ends are generally parallel and spaced apart by said sidewalls and by a distance that is greater than a couple of widths of said filter material.

10. The filter apparatus of claim 9 wherein said magnetic attachment means comprises magnets positioned within said housing at said back end.

11. The filter apparatus of claim 10 further comprising a rigid plastic frame peripherally positioned about a sheet of said filter material wherein said frame is positioned in said front end of said housing frame.

12. The filter apparatus of claim 11 wherein said decorative openwork is formed on a first plate attached to a first side of said frame covering a first face of said filter material.

13. The filter apparatus of claim 12 further comprising a second plate having said decorative openwork formed thereon attached to a second side of said frame covering a second face of said filter material.

14. The filter apparatus of claim 10 wherein said decorative openwork comprises louvers formed in a front plate of said housing that is integral with said sidewalls of said housing.

15. A filter apparatus for placement over an opening at a room duct end of a forced air system, said filter apparatus comprising:

a grill at a room duct end of a forced air system having supply and return ducts, a housing having sidewalls with channels, a flexible frame containing and supporting a removable filter, said frame removably positioned within said channels, a plate having decorative openwork positioned within said channels and in front of said filter, and a removable attachment means on a back of said housing and within said housing for mounting the filter apparatus in front of and over the opening.

16. The filter apparatus of claim 15, wherein said frame filter material is a self charging electrostatic washable material and said removable attachment means is a magnetic attachment means.

* * * * *